Oct. 30, 1962     H. B. FEHLMANN     3,061,100
FILTERING APPARATUS
Filed Aug. 29, 1958
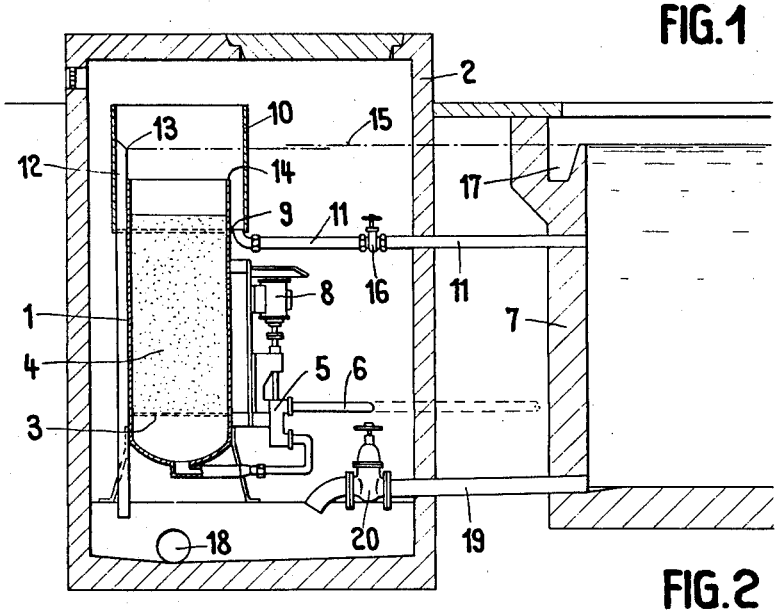
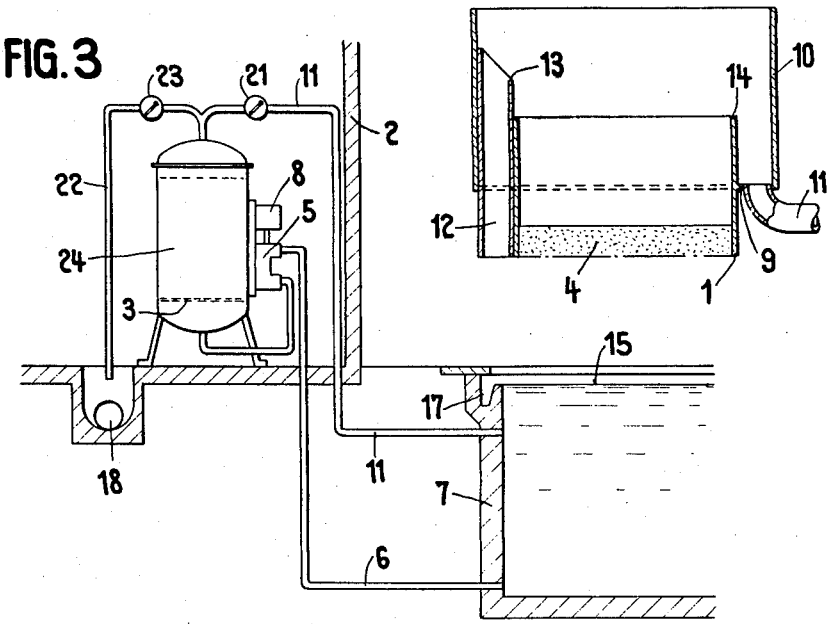
INVENTOR
Hans Beat Fehlmann
BY

United States Patent Office 3,061,100
Patented Oct. 30, 1962

3,061,100
FILTERING APPARATUS
Hans Beat Fehlmann, Muri, near Bern, Switzerland, assignor to A.G. für Grundwasserbauten, Bern, Switzerland
Filed Aug. 29, 1958, Ser. No. 757,958
Claims priority, application Switzerland Sept. 6, 1957
6 Claims. (Cl. 210—108)

The present invention relates to a method of cleaning a filter through which the liquid to be filtered is circulated by a pump.

In the known filtering plants the filters of which are cleaned by return rinsing it is usual practice to change over the position of sluice valves for the return rinsing in the closed or open filter circuit, so that the liquid flowing in reverse direction through the filter is discharged with the impurities through a drain pipe. In order to restore the normal operation of the filter, the position of the sluice valves has to be again changed over, at least two sluice valves being generally provided. These reversing valves of the known filtering plants raise the price of such plants since besides the valves circulating pipes are required, which necessitate watching of the filtering plane. Yet, the filtering plant of a swimming pool (e.g. of a small swimming pool) or of an installation for preparing drinkable water should as far as possible operate automatically and without any attendance.

The invention aims at rendering possible cleaning of a filtering plant by return rinsing without changing over any sluice valves and in a fully automatic manner. According to the invention, this purpose is attained by the fact that for cleaning the filter the pump is merely operated in the reverse direction with respect to the running direction during normal operation of the filter, thus resulting in return rinsing of the filter.

The invention also relates to an apparatus for carrying out the above-mentioned method, which is characterized by a reversible circulating pump mounted in such a manner in the travel of the liquid through the filter that the apparatus is automatically changed over, by merely reversing the direction of rotation of the circulating pump, from the normal filtering condition to the return rinsing condition of the filter and vice versa. Any reversing of sluice valves is thus done away with and the apparatus operates fully automatically.

The accompanying drawing shows, by way of example, one embodiment of an apparatus according to the invention used in connection with a swimming pool.

FIG. 1 is a sectional view of the filtering apparatus and of a portion of the swimming pool.

FIG. 2 illustrates a detail of FIG. 1, on a larger scale.

FIG. 3 shows a modified embodiment of the invention, with a closed filter container.

The filter proper 1 of the apparatus is placed in a pit 2 and has an active filter medium 4, e.g. sand, arranged on a supporting grid 3. The lower end of the filter container 1 is connected with a reversible, self-priming pump 5 through which the filtered water can be led to the non-illustrated end of the swimming pool or basin 7 over a fresh-water conduit 6. The circulating pump 5 is driven by a reversible electric motor 8 and is arranged in such a way that according to the direction of rotation of the motor 8 it forces the water in one or the other direction. The filter container 1 is open at its top and opens into a container 10 which is tightly welded as at 9 to the container 1. The container 10 is also open at its top and its bottom is traversed by the conduit 11 feeding the raw or polluted water into the filtering apparatus. The container 10 is provided with an overflow or waste pipe 12 terminating in an overflow orifice 13 lying above the upper edge 14 of the container 1 and slightly below the level 15 of the water contained in the basin 7 (FIG. 1). In the raw water conduit 11 is arranged an adjustable valve 16 by means of which the flow resistance of the conduit 11 may be regulated. The overflow trough 17 surrounding the basin 7 is connected with a conduit directly leading to the sewer 18 or to the raw water conduit 11. At the bottom of the basin 7 is provided an outlet conduit 19 through which the contents of the basin 7 may flow into the sewer 18 under the control of a cock 20.

The filtering apparatus as shown and described operates as follows:

If the basin 7 is filled up to the level 15 shown in FIG. 1, the filter 1 and container 10 are also filled, through the conduits 6 and 11, up to the orifice 13. Now, if the pump 5 is started in the normal direction of rotation, the liquid is circulated in a continuous closed circuit through the raw water conduit 11, the filter 1, the pump 5 and the fresh water conduit 6, and comes back to the basin 7. The delivery of pump 5 and the flow resistance of the raw water conduit 11 and of the valve 16 are adjusted in such a manner that the level of water above the filter medium 4 drops, until the water entering the filter 1 flows over the edge 14. Thus, the water level in the container 10 is substantially lower than the orifice 13, so that no water can flow through the orifice 13 into the overflow pipe 12.

For cleaning the filter, the direction of rotation of the motor 8 is periodically reversed, for instance each day at midnight, preferably by means of a known time switch, so that the direction of circulation of water through the filter 1 is reversed. Therefore, the impurities which had previously gathered as a cake in the filter are forced upwardly and are discharged from the filter 1, and the liquid level in the container 10 is raised at least up to the level 15 of the water contained in the basin 7, i.e. slightly above the orifice 13, so that the water containing the impurities flows through the overflow pipe 12 into the sewer 18. Since the water level in the basin 7 is generally slightly higher than the water level in the container 10, the raw or polluted water cannot come back into the basin 7 through the conduit 11. Even if the water level in the basin 7 is somewhat lower than the water level in the container 10, the raw water cannot come back into the basin 7 since the flow resistance in the conduit 11, which may still be adjusted by means of the valve 16, is too great so as to be overcome by the head of water between the level of the orifice 13 and the water level in the basin 7. On the return rinsing of the filter the level of the liquid in the container 10 is raised automatically only up to such a height that the raw water can flow through the overflow pipe 12, but cannot leave the container 10 through the conduit 11. After the return rinsing has been completed, the motor 8 is again automatically reversed, so that the normal operation of the apparatus again takes place as above described. The described filter, therefore, operates fully automatically, without reversing of sluice valves, but merely by reversing the direction of rotation of the motor 8 and the pump 5 respectively. The discharge of the raw water is thus simply obtained by using the pressure difference existing above the filter on return rinsing with respect to the normal operation of the filter.

Instead of or in addition to the valve 16, an automatic check valve 12 of known construction may be inserted into the return conduit 11, which valve 21 is automatically closed on return rinsing of the filter (FIG. 3). It is then possible to use a closed filter container 24 instead of the container 1 open at its top and the likewise open container 10 placed thereon, a discharge conduit 22 being connected with the container 24 above the filter medium. Owing to the check valve 21 automatically operating in the raw water conduit 11, the overpressure prevailing in the filter container 24 on return rinsing may be increased at will and therefore the raw liquid may reach any level before it is discharged through the conduit 22. It is recommended to arrange the discharge conduit 22 above the normal water level 15 in the basin 7, so that on an interruption of the operation of the apparatus, e.g. in case of failure of current supply, the water cannot flow through said conduit, unless a closing device is provided in the discharge conduit 22, which automatically operates on failure of the apparatus. In the case of a closed filter container 24 all connections of which are air-tight, this container may be placed completely (FIG. 3) or partially above the level 15 of the water in the basin 7. The check valve 23 closes the discharge conduit 22 during the filtering operation.

In order to increase the hydrostatic pressure in the filter container 10 for the flow of the water through the overflow orifice 13 during return rinsing of the filter, the pump motor 8 may be not only reversible, but also a pole changing motor, so that on return rinsing of the filter the pump is rotated quicker, for increasing the quantity of raw water flowing through the overflow pipe and therefore for increasing the efficiency of the return rinsing. This pole changing motor may also be provided in the embodiment shown in FIG. 3.

The filter need not necessarily be placed vertically. If the filter medium is arranged in a suitable manner, the filter might as well be traversed by water in a horizontal direction.

According to the invention other embodiments might be contemplated in which during return rinsing, i.e. during cleaning of the filter, raw water is fed to the filter as during the filtering operation.

The circuit of water in the apparatus need not be closed. Thus, for instance, in an installation for preparing drinkable water, it is possible, in the device of FIG. 1 as in that of FIG. 3, to connect the conduit 11 to a source of raw water (river, lake or reservoir of raw water fed by such a source) and to connect the conduit 6 to a reservoir of drinkable water. The circuit of water is then open, but the operation of the apparatus is the same as above described. It would also be possible, for instance in the case of an installation for the preparation of drinkable water in which the raw water is taken from a lake or a river, to lead back the water serving for rinsing the filter by means of the reversible pump into the lake or river into a place other than that in which the raw water has been taken. In this case, too, the circuit of water would be open.

Various changes in the construction, design and operation of the invention as shown and described, may be made, within the scope of the appended claims, without departing from the spirit of the invention or sacrificing any advantages thereof.

What I claim is:

1. In a filtering apparatus, a filter having a filter medium, an inlet and an outlet end, a raw fluid conduit discharging into the inlet end of said filter, a filtered fluid conduit connected to the outlet end of said filter, polluted fluid discharge means connected to the inlet end of said filter and separated from said filtered fluid conduit by said filter medium, a reversible pump mounted in said filtered fluid conduit for alternatively circulating fluid from said raw fluid conduit through said filter medium to said filtered fluid conduit, and from said filtered fluid conduit through said filter medium to said polluted fluid discharge means, means in said raw fluid conduit and said polluted fluid discharge means responsive to a pressure rise at said inlet and caused by one reversal of said pump for opening said polluted fluid discharge means and for blocking said raw fluid conduit, whereby fluid is discharged by the pressure of said pump through said polluted fluid discharge means, and responsive to a pressure drop caused by the other reversal of said pump for blocking said polluted fluid discharge means and opening said raw fluid conduit.

2. In a filtering apparatus, a filter having an inlet and outlet end, a raw fluid conduit continuously filled with fluid to be filtered and discharging into the inlet end of said filter, a filtered fluid conduit connected to the outlet end of said filter, a polluted fluid discharge means connected to the inlet end of the said filter, a reversible pump mounted in said filtered fluid conduit to circulate fluid alternatively for filtering service from said raw fluid conduit through said filter to said filtered fluid conduit, and for reverse-flow filter cleaning service from said filtered fluid conduit through said filter to the inlet end of the filter, first check valve means in said raw fluid conduit for permitting filtering service, and second check valve means in said polluted fluid discharge means for permitting reverse-flow filter cleaning service, the permitted directions of fluid flow in said first and second check valve means being opposite relative to said inlet end.

3. In a filtering apparatus, a filter having an inlet, an outlet, and a filtering medium arranged intermediate said inlet and outlet; a raw liquid supply conduit connected to said inlet; a waste conduit leading into said inlet; an outlet conduit for filtered liquid connected to said outlet; reversible pump means in said outlet conduit for alternatively pumping liquid through said medium from said inlet toward said outlet, whereby liquid pressure at said inlet is lowered, and from said outlet toward said inlet, whereby said pressure is raised; and means responsive to said lowered and said raised pressure for respectively blocking and permitting passage of liquid from said inlet through said waste conduit.

4. In an apparatus as set forth in claim 3, means for selectively blocking passage of liquid through said raw liquid supply conduit.

5. In a filtering apparatus, a filter comprising a substantially closed container, having an inlet end and an outlet end, and a filter medium intermediate said ends, a raw fluid conduit continuously filled with raw fluid, discharging into said inlet end, a filtered fluid conduit connected to said outlet end, a polluted fluid discharge conduit connected to said inlet end, a reversible pump mounted in said filtered fluid conduit to alternatively circulate fluid for filtering service from said raw fluid conduit through said filter to said filtered fluid conduit, and for filter cleaning service from said filtered fluid conduit through said filter to said polluted fluid discharge conduit, first check valve means arranged in said raw fluid conduit to automatically block said raw fluid conduit upon reversal of said pump to filter cleaning service, and second check valve means arranged in said polluted fluid discharge conduit to automatically block the latter conduit upon reversal of the pump to filtering service.

6. In a filter apparatus according to claim 5, a basin connected to said raw fluid conduit, the connection of said polluted fluid discharge conduit to said inlet end being positioned above any possible liquid levels within said basin.

References Cited in the file of this patent

UNITED STATES PATENTS 2,046,770    Coberly et al.            July 7, 1936

FOREIGN PATENTS 528,733    Great Britain            Nov. 6, 1940